FIP8102 XR 3,324,243 CROSS REFERENCE SEARCH ROOM

June 6, 1967 V. A. RATNER ETAL 3,324,243

FM RECORDING AND PLAYBACK

Filed Jan. 29, 1963 2 Sheets-Sheet 1

INVENTORS
VICTOR A. RATNER
EDWARD E. SWANSON
BY
Browne, Schuyler and Beveridge
ATTORNEYS INVENTORS
VICTOR A. RATNER
EDWARD E. SWANSON
BY
Browne, Schuyler and Beveridge
ATTORNEYS United States Patent Office 3,324,243
Patented June 6, 1967

3,324,243

FM RECORDING AND PLAYBACK

Victor A. Ratner, Silver Spring, and Edward E. Swanson, Rockville, Md., assignors to Defense Electronics, Inc., Rockville, Md., a corporation of Maryland Filed Jan. 29, 1963, Ser. No. 254,692
3 Claims. (Cl. 179—15.55)

This invention relates generally to the recording and playback of video signals and more particularly to the conversion of received signals from zero to 500 kilocycles to a modulated intermediate frequency signal which is then reduced in frequency for recording on a magnetic tape or the like, and to the up-conversion of the recorded signal at playback and its reproduction as the original video signal, including any direct current component therein.

In telemetering and like service great importance attaches to recording the signal before processing thereof and it is often essential that an incoming RF modulated with video signal be immediately recorded. For this purpose it is known to down-translate the incoming signal for recording purposes and thereafter to play this signal back with an up-translating arrangement to provide the signal required for demodulation or detection of the information contained therein, e.g., according to co-pending patent application, Ser. No. 197,712, filed May 25, 1962. Previous recording arrangements which detect the information prior to its recording suffer the disadvantage that some information may be lost during the processing, and a true recording is never achieved at those instants in which the processing is unsucessful for one reason or another. Previous means for recording video signals directly have suffered from the disadvantage that recording apparatus is not available for registering fatihfully those frequencies which lie below 400 or 500 c.p.s., or for some recorders, below 4000 c.p.s. Likewise it is not feasible to record directly the high frequency incoming signal because of the extreme tape speeds which would be required and limits to the frequencies which will be passed by magnetic recording heads.

An object of the invention is therefore to provide apparatus and method for magnetically recording video signals including direct current and low frequency components.

Another object of the invention is to provide a system for storing and reproducing a video signal including direct current and low frequency signal components.

Another object of the invention is to provide apparatus and method of converting a video signal into a frequency modulated IF signal for recording within a broad frequency range such as 100 to 1500 kc.

A further object of this invention is to provide an improved stabilized and frequency-controlled local oscillator as the generator of a frequency modulated signal including a video feed-back loop to assure that the output frequency is varied according to a video input regardless of local oscillator drift characteristics.

A still further object of the invention is to provide balance and test means to eliminate systematic errors in the output frequency of a voltage controlled oscillator.

Another object is a method of information recording and recovery wherein the accuracy of frequency recording is determined principally by a highly stable discriminator characteristic rather than by the oscillator characteristic.

Applicant achieves these and other objects in a system in which a video input is passed by way of a direct coupled differential amplifier to a voltage controlled oscillator to produce an IF output frequency, varied within prescribed limits as to frequency according to the video signal which is compared in the differential amplifier with a demodulated video product of the oscillator to produce stabilized output to a heterodyne circuit fed also with a fixed frequency for the purpose of down-translating this IF frequency to an IF frequency suitable for recording. Oscillator drift and non-linearity in the recorded signal are avoided by the D.C. differential amplifier circuit when fed video input and a portion of the frequency modulated IF signal passed through a limiter and a discriminator, preferably with an attenuator for level control to provide differential amplification of video input and discriminator output as the oscillator frequency control voltage. A stable fixed frequency is mixed with the stabilized FM signal to produce an IF signal which may vary between chosen limits such as .4 mc. and 1.4 mc. for producing a tape recording which may be read back at any time to produce a signal for reconversion into the original video signal by way of up-translation to the first IF and demodulation to produce the video signal. A D.C. amplification of the video signal preserves linearity. Errors in frequency modulation of the IF carrier are self-corrected through differential amplification of differences of output modulation from the video input, within the accuracy of the adjusted discriminator, then to be heterodyned with a crystal controlled frequency. In playback a wide band video transformer produces a pair of signals for combining in a pair of balanced modulators with a crystal controlled local oscillator output at carrier IF so phased as to eliminate the center frequency and one of the side bands resulting from the mixing of the local oscillator output with each of the input signals. These signals are combined in a transformer to produce an output signal of the same frequency components generated by the voltage controlled oscillator in the recording portion of the system. The result is then limited and discriminated preferably with filtering and amplification to provide an output signal which is the video signal initially received for recording.

A more detailed understanding of the invention will be had by reference to the accompanying drawings in which.

Figures 1, 3:
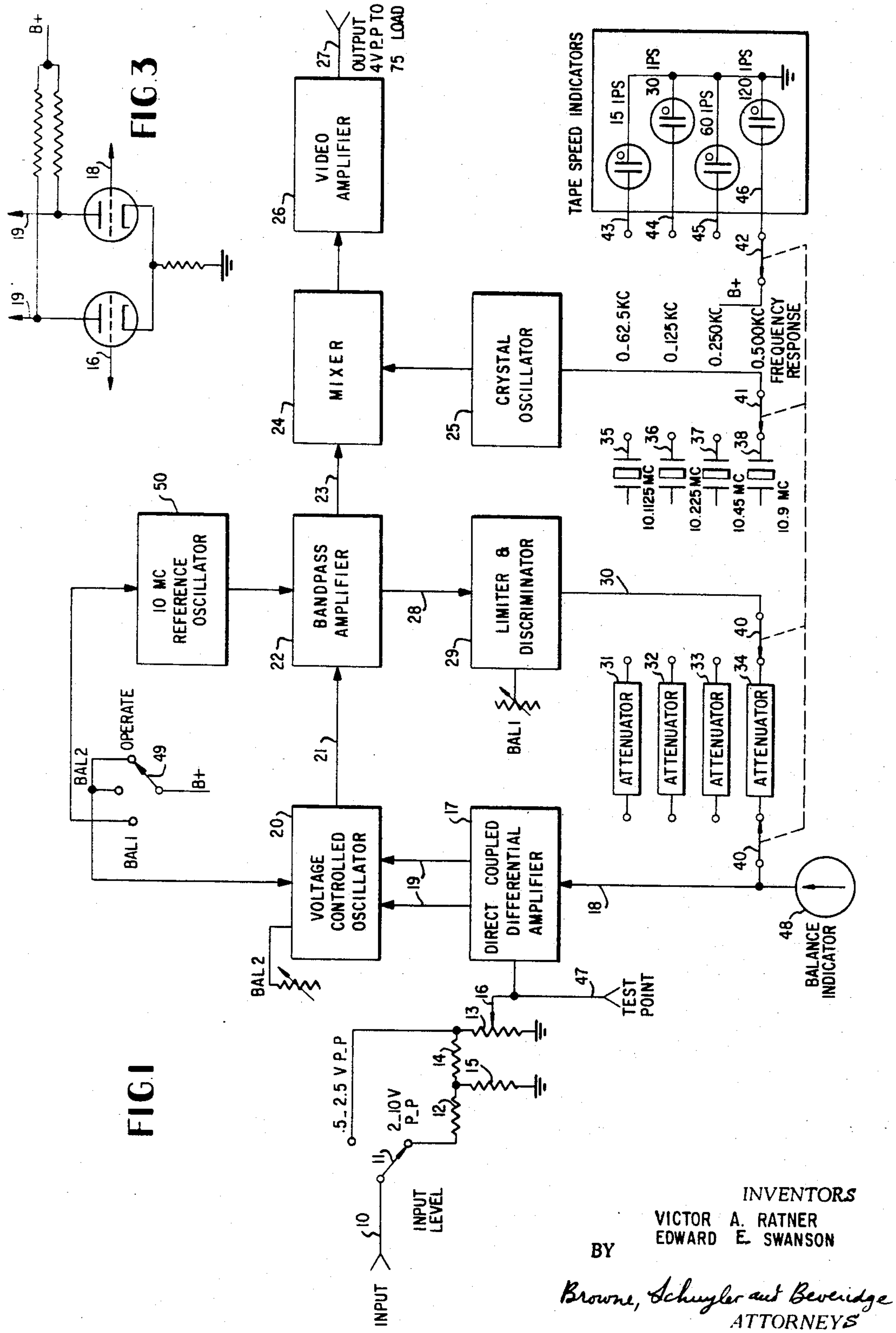
FIG. 1 is a block diagram of the recording portion of the apparatus showing differentially stabilized frequency modulation, and down-translation of the frequency modulated wave.
FIG. 3 illustrates a simple form of differential amplifier useable in the apparatus of FIG. 1.
Figure 2:
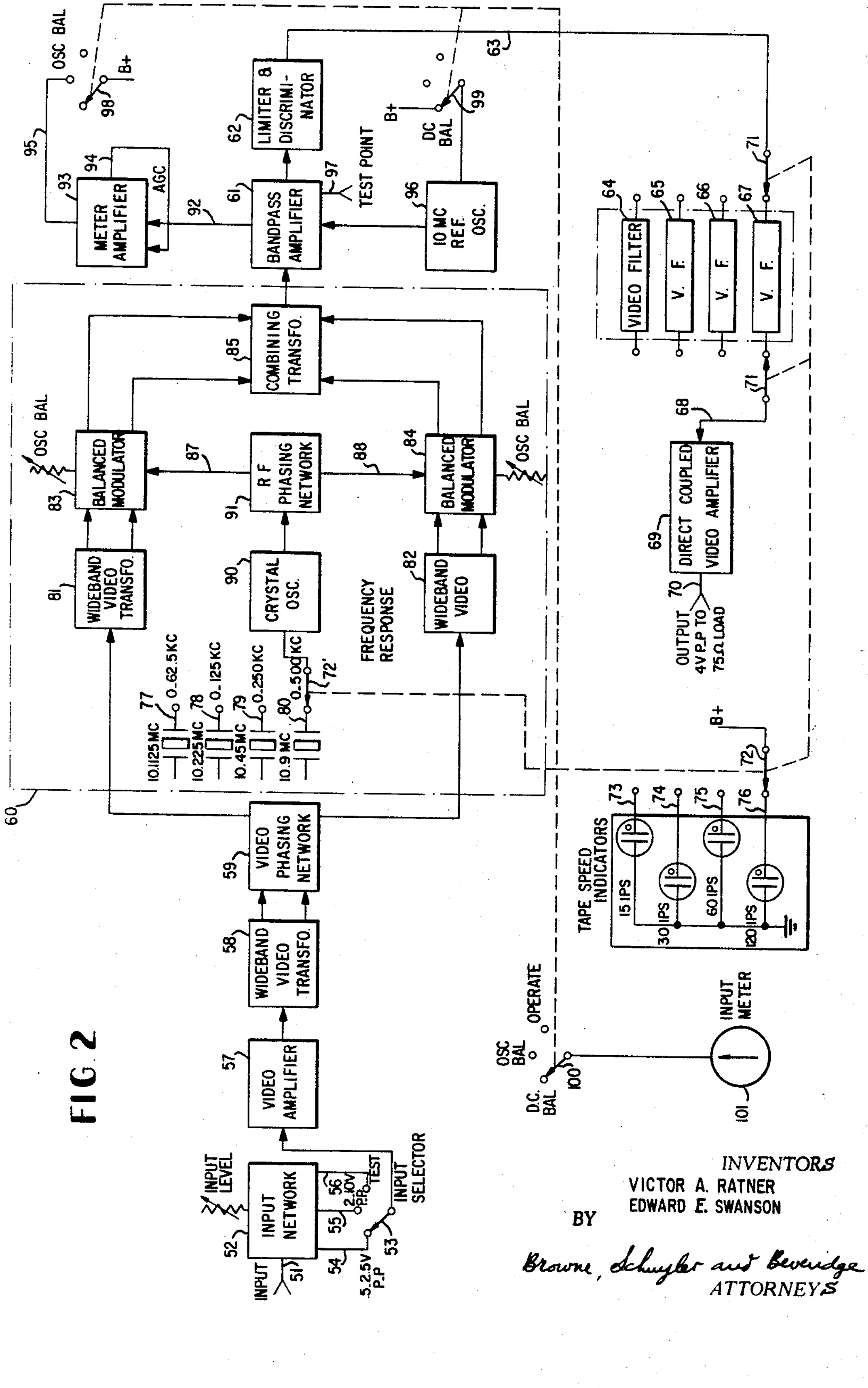
FIG. 2 is a block diagram of the corresponding playback portion of the system and includes amplification, up-translation with center and one side band frequency cancellation, and discrimination to provide an output video signal corresponding to that recorded in FIG. 1.

The recording phase of the record and playback apparatus will first be described. It will be assumed that a video signal has been derived from some source of intelligence as by way of a signal from a communication satellite, missile, or other terrestrial station. The recording of such a signal is a problem under previous arrangements in that it contains a continuous or variable D.C. component along with frequency components extending up into the megacycle region. For the purposes of this description it will be assumed that the maximum video band spread is 500 (kc.) and that the apparatus may be employed for differing purposes in which some may not require as much band width, as for example, when the incoming signal has been multiplexed or otherwise condensed into frequency bands, here illustrated as 62.5 kc., 125 kc. or 250 kc.

Since the signal may be of various strengths the recorder input has two ranges of which one might be .5 to 2.5 volts and the other 2 to 10 volts. A switch 11 is provided for shifting from one to the other of these two inputs, one of which passes through attenuating resistor 12 and the other passes directly to an input level control rheostat 13. Attenuation for the high level input may include resistor 14 connected in series with resistors 12 and 13 with resistor 15 shunting the junction of resistors 12 and 14 to ground.

The input signal is taken by way of contact arm of rheostat 16 to a direct coupled differential amplifier 17 for which a second input connection 18 provides for signal input to produce an output differential voltage with respect to the two inputs at 16 and 18. Such an amplifier may consist of one or more stages in which each stage may be a pair of transistors or triode tubes, in which the tubes have a common cathode connection to ground through a common biasing path. The anodes of these tubes are connected through separate load resistors to a B+ supply. The grids of these tubes are connected one to the line 16 and the other to the line 18 so that like potentials at the two grids result in like current flow in the two tubes and their like load circuits. A differential load resistor may be connected between the two anodes and any difference in current between the two tubes produces a voltage therebetween. Like positive or like negative input voltages thus produce no voltage across the differential output of such an amplifier. On the other hand any difference in voltage input to the two grids results in a difference of potential at the two anodes which voltage, according to well-known practice, may be taken as the differential amplifier output as at the two lines 19.

Various forms of voltage controlled oscillator might be employed for the purpose of this invention being generally illustrated at 20, and consisting of an RC or an LC network and an amplifier with appropriate feedback to maintain oscillation and with reactance components selected to cause oscillation within the desired frequency range, here illustrated as having a center frequency of 10 mc. It is the purpose of the voltage controlled oscillator to provide a video carrier frequency which may be modulated by the video signal. The oscillator includes an amplifier which may employ in the grid circuit a capacitor which exhibits the characteristic of capacity varying in proportion to the voltage there across, to control the oscillator frequency according to well-known practice. Such a voltage controlled oscillator may thus have a frequency output which varies over a substantial fraction of the basic oscillator frequency. Another form of such voltage controlled oscillator may use the well-known reactance tube and its associated circuitry. Also certain forms of semiconductor diodes may be employed in the oscillator amplifier grid circuit to effect variation of frequency output. In any of the forms selected output lines 19 are connected across the element which is responsive to varying voltage to proportionally change the oscillator frequency.

If the oscillator 20 is assumed to have an output at 10 mc. (adjusted by BAL 2) when no voltage difference occurs between the lines 19 the output of the oscillator 20 is taken by way of line 21 to a band pass amplifier illustrated at 22 and thence by line 23 to mixer 24, which is also supplied with a stable frequency from a crystal controlled oscillator output such as 10.9 mc., which, upon mixing in the mixer 24 produces an output of .9 mc. when no voltage occurs between lines 19, and this output at .9 mc. is amplified in the video amplifier 26 as signal output at terminal 27, which may normally be connected to the input of a standard magnetic recorder, or the like, having a frequency range preferably of about 1.5 mc. for recording at a tape speed of 120 inches per second. With no voltage between the lines 19 a 900 kc. signal is thus steadily recorded from the output at 27.

In a simple heterodyne circuit so far described the output would be directely dependent upon the accuracy of the voltage controlled oscillator. Such an oscillator is to be varied in output frequency and can not be a highly stable oscillator. Frequency instability is of several kinds and includes temperature effects, voltage source variation, ageing characteristics, and a number of other factors. To stabilize this oscillator with respect to drift, voltage supply, and other factors, a nulling circuit is used to control the oscillator. Band pass amplifier 22 has an onutput connection 28 which is taken to a limiter and discriminator circuit of conventional design such as Foster Sealey discriminator producing an output signal at line 30 similar to the output of the frequency discriminator of a conventional FM receiver, if fed the 10±.5 mc. signal. This signal is the video signal input after amplification at 17 and may contain frequencies from zero to the limits of the video input employed, e.g., 500 kc.

Because the video input may come from several sources having different frequency spread it is preferable to employ an attenuator for the output in line 30 in order that different recording rates may be accommodated with suitable levels of input as will hereafter be described. For this purpose attenuators 31, 32, 33 and 34 are illustrated as being selectable between lines 30 and 18, and an output from the discriminator 29 is thus fed to the second input of the differential amplifier at line 18 after attenuation as required to balance the modulation to the recording speed selected.

Amplifier 17 thus has input signals from lines 16 and 18 which may be phased for coincidence within the range from direct current to the upper limit of the video signal. It will thus be clear that a direct current voltage at line 16 will result in a differential voltage at lines 19 which will alter the oscillating frequency of the oscillator 20 as near as may be desired to that at line 16, and that this results in a carrier wave in line 21 which differs from 10 mc. by the instantaneous differential voltage times the selected factor of frequency control. Let it be assumed that plus 1 volt difference between the lines 19 results in 400 kc. upward shift of the carrier signal. This results in a carrier signal of 10.4 mc. being passed to the discriminator 29 and thence by way of attenuator 31–34 and line 18 to the grid of the second tube of amplifier 17. Since a steady frequency is discriminated to produce a steady direct current voltage this voltage will appear at the second grid of the differential amplifier, and is connected in phase with the similar voltage at the first grid, thus to cause an increase in the conductivity of the second triode resulting in a decrease in the current in the first triode inasmuch as both have cathodes connected to ground through a common resistor. It will be seen that this D.C. input at 16 will therefore be very nearly neutralized by virtue of the feedback or nulling loop comprising the frequency modulation stage, the amplification and band pass stage, the limiter and discriminator stage, and the level control attenuation. A small factor of difference between voltages thus compared leaves the controlled oscillator output with a desired degree of shifted frequency to be recorded as the desired variation from the 900 kc. at output 27.

When the video signal is made to center at a mean potential an A.C. signal is impressed on line 16 and the same control sequence operates to provide instantaneous differential voltages across the control element of the oscillator 20 with resulting variations of the carrier frequency such as ±.5 mc. from 10 mc. The band pass amplifier 22 is designed to accept frequencies only a little greater than the frequency range the carrier as modulated by the video signal to be recorded, and this frequency modulated carrier is processed in the discriminator 29 and the recovered video taken to the grid of the second tube of the differential amplifier as previously described, so that the voltage controlled oscillator output corresponds accurately to the video signal employed, within the capabilities of the limiter and discriminator 29. The use of a limiter and discriminator as the ultimate control of accuracy in the frequency modulated wave greatly increases the reliability and frees the output frequency from the much wider frequency errors necessarily inherent in a controlled oscillator. Thus the video input signal is compared with the video signal derived from the frequency modulated carrier and the modulation is corrected to agree with the video signal. It will be appreciated that any non-linearity of frequency modulation occurring as the result of inaccuracies in oscillator, amplifier or voltage sensitive element or in the band pass amplifier loop will result in an increase of voltage difference between the signals impressed upon the two grids in the differential amplifier, and that this constitutes an error signal so phased as to oppose the error, while too small a frequency shift results in a larger differential voltage to correct the modulation to the selected factor regardless of component errors other than those of the discriminator itself.

Mixer 24 receives a stabilized carrier frequency modulated both by direct current input signals and by other components of a video signal, and circuit elements including 17 and discriminator 29 must be linear for A.C. and D.C. voltages. Elements 20 and 22 and elements 24 and 26 are required only to respond linearly at high frequencies. Since the carrier frequency at line 23 represents the corrected and linearized 10 mc. carrier modulated to a band width of approximately 1 mc., as required for accurate linear frequency modulation, the result is a signal which is not directly recordable on commercial magnetic tape apparatus, which generally has an upper frequency limit of 4 mc. even at extreme speeds of tape movement.

The crystal oscillator 25 is of conventional design and provides by way of conventional crystal circuits 35, 36, 37 and 38 a heterodyning reference frequency to be mixed in the mixer 24 with the stabilized FM signal to produce a recordable frequency carrying the video signal. The circuit 38 is illustrated as having crystal frequency of 10.9 mc. which may be mixed with the 10 mc. signal plus or minus .5 mc. and the output of the mixer would be a signal of .9 mc. plus or minus .5 mc. to the video amplifier 26 and thence to output terminal 27. Crystal circuit 37 is shown to have a crystal oscillating at 10.45 mc. which mixes with the modulated carrier when it has a maximum of 250 kc. variation to produce a mixer output at 450 kc.±250 kc. Similarly a circuit 36 includes a crystal operating at 10.225 mc. employed with a carrier varying only by 125 kc. to produce a mixer output at 225 kc.±125 kc. Circuit 35 illustrates a crystal operating at 10.1125 mc. used with a carrier varying only by 62.5 kc. to produce a mixer output at 112.5 kc.±62.5 kc.

From the foregoing it will be apparent that the same resolution is obtained in a recording at 120 inches per second when the modulation is 500 kc., at 60 inches per second when the modulation is 250 kc., at 30 inches per second when the modulation is 125 kc. and at 15 inches per second when the modulation is 62.5 kc. While the tape resolution is alike for these conditions the output signal level in a playback apparatus would be different. Similarly the discriminator 29 would have a different output level depending upon the frequencies employed. For this purpose the four attenuators 31, 32, 33 and 34 are provided as illustrated each appropriately adjusted. These attenuators are preferably incorporated in the feedback circuit by means of a double pole switch 40 which is ganged with a switch 41 and a switch 42 to couple in the attenuator appropriate to the crystal circuit employed, and at the same time to provide a lamp indicator output at 43, 44, 45 or 46 which indicates the center frequency of the output at terminal 27 appropriate to the different recording speeds, and to the frequency modulation thereof. Manual control of the tape speed is here shown by way of illustration and the circuits 43, 44, 45 and 46 serve as indicators of the manual control speed to be selected. An automatic change of the tape speed might be effected in suitable circuitry actuated by the operation of the switch 42.

A number of difficulties would be encountered in a circuit working according to the description heretofore provided, and means for overcoming these difficulties will be further described. Long term drift may occur as a result of any of the electronic processing steps in such a recorder, and this is of particular importance in connection with recording a D.C. input or very low frequency signals. The amplifier 17 may change as a result of tube ageing, and for other reasons, with the result that an incorrect feedback of voltage may occur to change the voltage between lines 19 as a result of a particular steady voltage at line 16.

It is accordingly appropriate to provide various balancing means and to provide a standardized frequency output at terminal 27 either for no signal or for a D.C. signal input. For this purpose there is provided a test point at connection 47 by which a standardized steady voltage may be impressed on the line 16, and there is provided a balance indicator, preferably on oscilloscope 48 which may be connected to the line 18 to indicate, among other things, D.C. feedback voltage employed as the differential input opposite that at 16. Switch 49 is provided for the purpose of balancing the recorder initially and to provide a means of standardizing the stabilized frequency of the FM output in line 23. Reference oscillator 50 is illustrated as of conventional design such as the oscillator 25 but of accurately controlled frequency at the design center frequency for the oscillator 20. In the illustration the output of the oscillator 50 is 10 mc. and is provided whenever the switch 49 is moved to the position indicated BAL 1 thereby to energize the oscillator 50 from a B+ source to provide an input at band pass amplifier 22, the voltage controlled oscillator being disconnected from the circuit by switch 49 as illustrated. The amplifier 22 has an output to the discriminator 29, and balance indicator 48 is arranged to indicate whether the voltage applied to line 18 is above or below the design value for zero frequency modulation. The discriminator zero function may be adjusted by conventional means illustrated generally at BAL 1 associated with the limiter and discriminator 29. When the discriminator zero has been adjusted, switch 49 may be placed on BAL 2 thereby to energize the voltage controlled oscillator and to disconnect the reference oscillator 50. A 500 kc. voltage such as one-half or one volt may then be used to standardize the frequency shift factor. Such voltage is measured or applied at the test point 47 and the resulting frequency output of the oscillator 20 may be adjusted by means of a conventional potentiometer arrangement illustrated at BAL 2 shown connected to oscillator 20. It might be determined that one-half volt D.C. at line 16 should result in a change of 200 kc. in the output of oscillator 20. A feedback signal may be read at indicator 48 corresponding thereto, which is adjusted to a suitable value by means of the balance adjustment for oscillator 20. When the switch 49 is placed in the OPERATE position, as illustrated, the recorder frequency control circuitry operates as previously described.

In a record and playback system according to this invention a magnetic tape operating at 15, 30, 60 or 120 inches per second carries a frequency modulation signal of which the upper limit is directly proportional to the tape speed, being 175 kc., 350 kc., 700 kc., and 1400 kc., respectively. The lower frequency limit on each of these tape speeds is likewise proportional to the tape speed being 50 kc., 100 kc., 200 kc., and 400 kc., respectively. Such a tape recorder, when operated in the playback condition, will produce an output at terminal 51 corresponding accurately to the recorder input at terminal 27, the same being merely delayed in time of delivery according to the needs.

It will be understood that numerous modifications and variations may be made in a system according to this invention and that applicants do not intend to be limited to a specific form thereof except in accordance with the scope of the appended claims.

What is claimed is:

1. Record and playback apparatus for reproducing a video signal including direct current components, comprising, differential amplifier means responsive to first and second input signals, a video signal source connected to provide said first signal, voltage controlled oscillator means for generating a variable frequency wave above the frequency of said video signal including a voltage responsive frequency control element connected to said amplifier means, discriminator means responsive to the frequency of output of said oscillator for re-creating said video signal, means for applying said re-created signal as said second input signal, thereby to control the output frequency of said oscillator at a predetermined frequency modulation factor, said means applying said re-created signal as said second input signal includes selectable attenuator means controlling said modulation factor in accordance with the frequency range of said video signal as modulated on said recording frequency, and means translating said variable frequency wave to a lower frequency to represent said video signal at a recording frequency.

2. Record and playback apparatus for reproducing a video signal including direct current components, comprising, differential amplifier means responsive to first and second input signals, a video signal source connected to provide said first signal, voltage controlled oscillator means for generating a variable frequency wave above the frequency of said video signal including a voltage responsive frequency control element connected to said amplifier means, discriminator means responsive to the frequency of output of said oscillator for re-creating said video signal, means for balancing said discriminator to produce a predetermined frequency shift of said variable frequency wave in response to direct current input voltage as said first video signal, means applying said re-created signal as said second input signal, thereby to control the output frequency of said oscillator at a predetermined frequency modulation factor, and means translating said variable frequency wave to a lower frequency to represent said video signal at a recording frequency.

3. Record and playback apparatus for reproducing a video signal including direct current components, comprising, differential amplifier means responsive to first and second input signals, a video signal source connected to provide said first signal, voltage controlled oscillator means for generating a variable frequency wave above the frequency of said video signal including a voltage responsive frequency control element connected to said amplifier means, said voltage controlled oscillator being connected to produce a variable frequency output signal proportional to the difference between the signal from said video signal source and a second video signal derived as signal output of said discriminator means controlled to be in phase with the video signal from said source whereby said first and second input signals are inputs for said differential amplifier means of which an amplified difference is applied to said control elements, discriminator means responsive to the frequency output of said oscillator for re-creating said video signal, means applying said re-created signal as said second input signal, thereby to control the output frequency of said oscillator at a predetermined frequency modulation factor, and means translating said variable frequency wave to a lower frequency to represent said video signal at a recording frequency.

References Cited

UNITED STATES PATENTS

| | | | |
|---|---|---|---|
| 2,992,417 | 7/1961 | Hoefs | 340—207 |
| 3,040,125 | 6/1962 | Dillenburger | 178—6.6 |
| 3,199,028 | 8/1965 | McLin | 325—148 |

DAVID G. REDINBAUGH, *Primary Examiner.*

H. W. BRITTON, *Assistant Examiner.*